Figure 1:
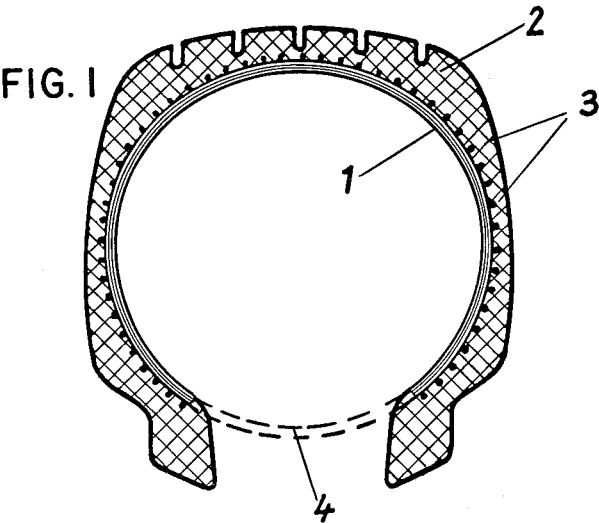

United States Patent Office 3,216,476
Patented Nov. 9, 1965

3,216,476
PNEUMATIC TIRE
Franz G. Reuter and Reinhold E. Szonn, Lemforde, Germany, assignors to Cellasto Incorporated, Ann Arbor, Mich., a corporation of Michigan
Filed July 22, 1963, Ser. No. 296,639
1 Claim. (Cl. 152—354)

The invention concerns a pneumatic tire, particularly for vehicles, consisting of an elastomer material with a reinforcing insert installed between superstructure and substructure.

Customary pneumatic tires on a rubber base are subject to the shortcoming that they have been manufactured from a comparatively heavy material, so that large centrifugal forces result particularly during high speed which have a disadvantageous effect on the life of the tire and which impose certain limits to the speeds. The smooth surface structure of such rubber tires furthermore has the disadvantage that a good road traction cannot be guaranteed, particularly on wet or slippery pavement. Furthermore, an extensive technological inventment is required in the manufacture of such rubber tires which is conditioned by the high vulcanization pressures and the high strength requirements of the vulcanizing molds.

The purpose of the invention is the production of a pneumatic tire which is superior to known tires with respect to the weight ratios and the production costs and which is distinguished by improved road traction.

The invention consists of the substructure of the pneumatic tire consisting of a porous-elastic material with a pore structure which is open in the direction of the superstructure and with the superstructure consisting of homogeneous or porous-elastic material, where the superstructure and substructure are anchored to each other in the region of the perforations of the reinforcing insert due to the penetration of the material of the superstructure into the pores of the substructure. Due to the porous-elastic structure of the tire material, a considerable weight reduction results in addition to a better road traction since with the use of a porous-elastic material for the superstructure the existing pores cause a suction-adhesion to the pavement. Production-wise the superiority of the present invention can be found in the fact that polyurethane material, for example, permits casting, and that the superstructure thus can be cast on the substructure. As a consequence, relatively low operating pressures can be applied and only inexpensive molds of light construction are required.

The greatest advantage of the invention can be anticipated when the substructure as well as the superstructure consists of a porous-elastic material, where it is possible to have material of different pore density for the substructure and for the superstructure. Such a tire has a particularly low initial weight and favorable characteristics, because a fairly simple profile can be selected for production since the pores existing in the running surface guarantee road traction due to the suction effect.

Additional characteristics and details of the invention result from the following explanation of the drawing.

Figure 2:
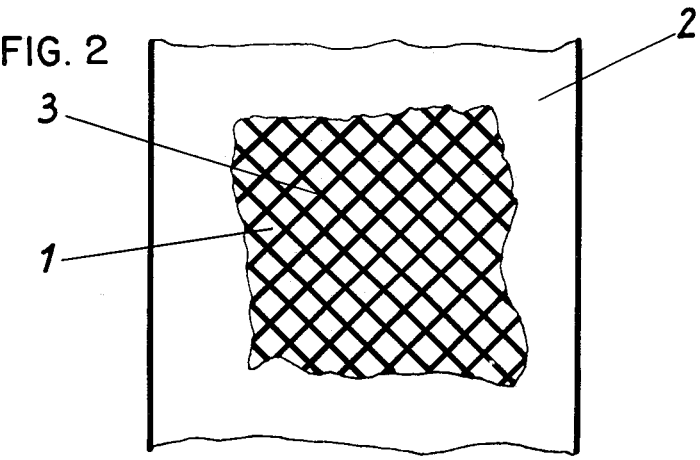

The following is shown:
FIG. 1, a tire of the invention in cross-section.
FIG. 2, a detail, namely a top view on a reinforcing insert, utilized as example.

The tire shown according to the invention consists of the substructure 1 and the superstructure 2 between which the reinforcing insert 3 has been imbedded. The characteristics of the invention is that the substructure 1 consists of a porous-elastic material—preferably on a polyurethane base—with a pore structure which is open in the direction of the superstructure. In this case, the substructure can be formed from strips of a porous-elastic material wound on a core in single or multilayers and wound preferably in the direction of a helix around a core. The strips can also cross each other. By cementing the layers of a porous-elastic material, a particularly strong structure can be obtained for the substructure. If strips of a porous-elastic material with a continuous open pore structure are utilized for the individual layers, the layer bonding can also be effected due to impregnation by the subsequently applied material of the superstructure. This would eliminate a separate processing step for the bonding of the layers.

A reinforcing insert which can consist, for example, of layers of cord filaments 3 or strips of wire mesh, is applied around the sketched substructure of the wire. These reinforcing inserts can consist of fabric or metal.

For the superstructure 2, it is a homogeneous-elastic structure but preferably a porous-elastic structure can be used in order to obtain the previously mentioned advantage of optimum road traction without mechanical artifices in profiling.

Bonding of superstructure and substructure is produced by an open-pore structure in the substructure in the direction of the superstructure into which the material of the superstructure penetrates during casting on the substructure, thus forming a tight bond. By selecting various pore sizes for super- and substructures, it is possible to take into consideration any desirable elasticity and traction characteristics of the tire. Weight ratios and other characteristics can also be extensively controlled by this measure.

In the manufacturing process, the substructure is first placed on a suitable core in the form of helically wound strips consisting of a porous-elastic material, followed by the reinforcing insert which in turn is followed by the application of the superstructure, preferably by casting. After hardening of the elastomers, the lower section of the substructure and reinforcing insert indicated by 4 is removed, whereby the manufacture of the tire is terminated.

We claim:
Pneumatic tire, particularly for vehicles, consisting of an elastomer material with a perforated reinforcing insert which is embedded between superstructure and substructure, characterized by the fact that the substructure consists of porous-elastic material with open pore structure towards the superstructure and that the superstructure consists of homogeneous material, where superstructure and substructure are anchored together in the region of the perforations of the reinforcing insert due to the penetration of the superstructure material into the pores of the substructure, characterized also by the fact that the substructure is formed of a strip of porous-elastic material wound on a core in one or more layers.

References Cited by the Examiner
UNITED STATES PATENTS

| | | | |
|---|---|---|---|
| 1,228,099 | 5/17 | Dew | 152—354 X |
| 2,118,774 | 5/38 | Cadwell | 152—374 |
| 2,902,072 | 9/59 | Reuter | 152—354 X |
| 2,925,623 | 2/60 | Bekadolph | 152—354 X |

ARTHUR L. LA POINT, Primary Examiner.